United States Patent Office 2,765,256
Patented Oct. 2, 1956

2,765,256

INJECTABLE SOLUTIONS OF DIGOXIN

Ernest L. Beals and Malcolm S. Trupp, Westchester County, N. Y., assignors to Burroughs Wellcome & Co. (U. S. A.) Inc., Tuckahoe, N. Y., a corporation of New York No Drawing. Application May 22, 1953, Serial No. 356,886

6 Claims. (Cl. 167—65)

The present invention relates to injectable concentrated solutions of digoxin for cardiac therapy. Until recently medication with digitalis involved use of extracts that contained a number of related cardiac glycosides. The problems connected with this type of preparation were mainly in the line of preservation. Such crude extracts also contained enzymes capable of degrading the glycosides and thereby lessening the potency of the extract.

When methods became available for the preparation of the pure glycosides in adequate quantity many physicians preferred to administer these pure substances as such. One of these glycosides is digoxin whose effects are in some respects more desirable than those of the other digitalis glycosides or of the total extract. Although digoxin is most frequently administered orally, it is sometimes desirable to inject a solution to produce a more rapid effect. The present invention deals with solutions suitable for such purposes and has as a primary object the preparation of soluble digoxin solutions containing digoxin in therapeutically significant concentrations.

Digoxin is rather insoluble in water. Although it is present in crude extracts of digitalis, such extracts have little tendency to deposit crystalline digoxin or any other materials, it being well known to chemists that the presence of other and especially of related compounds tends to increase the solubility of the solutes. As a pure substance, however, it is not possible to dissolve a therapeutically useful quantity in a volume of water convenient for injection. Hitherto it has been customary to supply it dissolved in alcohol or aqueous alcohol and for the physician to dilute such a solution with water immediately before administering it. The diluted solutions containing about 10% alcohol will deposit crystals of digoxin on standing.

It has now been found that solvents consisting of water, ethanol and propylene glycol in the proper proportions will dissolve 0.2 mg. or more of digoxin in 1 ml. of aqueous solution and such solutions permit a physician to inject conveniently any dose his patient is likely to require. Suitable solutions for this purpose are those containing approximately 5 to 10 per cent by volume of ethanol, 30 to 40 per cent by volume of propylene glycol and not less than 50 per cent by volume of water. Solution is preferably obtained by diluting the alcohol to about an 80 per cent concentration with water and dissolving the required amount of digoxin in the alcoholic solution. Propylene glycol is then added along with the balance of the water.

The solubility of digoxin in aqueous alcohol propanediol solutions within the ranges set forth and which produce therapeutically significant concentrations of the drug may be represented by the following examples.

| Alcohol, Percent | Propylene Glycol, Percent | mg./cc. |
|---|---|---|
| 5 | 40 | 0.2370 |
| 6 | 40 | 0.2877 |
| 7 | 38 | 0.2637 |
| 8 | 37 | 0.2656 |
| 10 | 30 | 0.1920 |
| 10 | 40 | 0.4036 |

Of the above mixtures it has been found that a solution containing 8 per cent alcohol, 37 per cent propylene glycol and 55 per cent water produced a highly desirable solvent medium for injection purposes. A further highly desirable and more concentrated solution was obtained using 10 per cent alcohol, 40 per cent propylene glycol and 50 per cent water.

The surprising feature of the invention is that as compared with a solvent medium consisting of aqueous propylene glycol the addition of alcohol greatly increases the solubility characteristics of the medium. For example, the solubility of a solvent mixture consisting of 40 per cent propylene glycol and 60 per cent water capable of dissolving a maximum of 0.1387 mg./cc. of digoxin was increased to around 0.4036 mg./cc. of digoxin by the addition of 10 per cent alcohol.

Furthermore this synergistic effect is found to prevail substantially over the ranges set forth above in that the addition of small quantities of alcohol to the propylene glycol aqueous mixture tremendously increased the solubility of the drug in the solvent mixture.

We claim:

1. An injectable solution comprising digoxin in an aqueous solvent mixture consisting of propylene glycol, water and a small quantity of alcohol the quantity of solute exceeding the normal additive solubilities of the solute in each of the solvents.

2. An injectable solution comprising digoxin in a solvent mixture consisting of propylene glycol, water and alcohol the quantity of solute exceeding the normal additive solubilities of the solute in each of the solvents.

3. An injectable solution comprising digoxin in a solvent mixture consisting of approximately 5 to 10 per cent alcohol, 30 to 40 per cent propylene glycol and not less than 50 per cent water the quantity of solute exceeding the normal additive solubilities of the solute in each of the solvents.

4. An injectable solution comprising digoxin in a solvent mixture consisting of approximately 37 per cent propylene glycol, 8 per cent alcohol and 55 per cent water the quantity of solute exceeding the normal additive solubilities of the solute in each of the solvents.

5. An injectable solution comprising at least 0.2 mg./cc. of digoxin in a solvent mixture consisting of approximately 5 to 10 per cent alcohol, 30 to 40 per cent propylene glycol and not less than 50 per cent water the quantity of solute exceeding the normal additive solubilities of the solute in each of the solvents.

6. An injectable solution comprising digoxin in a solvent mixture consisting of approximately 40 per cent propylene glycol, 10 per cent alcohol and 50 per cent water the quantity of solute exceeding the normal additive solubilities of the solute in each of the solvents.

References Cited in the file of this patent

UNITED STATES PATENTS

| | | |
|---|---|---|
| 2,052,150 | Torigian | Aug. 25, 1936 |
| 2,415,312 | Thompson | Feb. 4, 1947 |

OTHER REFERENCES

Brown: Quart. Jour. Pharm. & Pharmacol. 8 (1935), pp. 390–397.

The Pharmacopoeia of U. S., 13th ed., pp. 178–9, April 1947.